United States Patent [19]
Ogino et al.

[11] Patent Number: 5,517,210
[45] Date of Patent: May 14, 1996

[54] MULTI-SCAN TYPE DISPLAY SYSTEM WITH POINTER FUNCTION

[75] Inventors: Masanori Ogino; Yasuharu Tamuro; Miyuki Ikeda; Fumio Inoue, all of Yokohama, Japan

[73] Assignee: Hitachi, Ltd., Tokyo, Japan

[21] Appl. No.: 115,025

[22] Filed: Sep. 2, 1993

[30] Foreign Application Priority Data

Feb. 26, 1993 [JP] Japan .................. 5-037825

[51] Int. Cl.$^6$ .................. G09G 5/08
[52] U.S. Cl. .................. 345/157; 345/113
[58] Field of Search .................. 345/113, 157, 345/156, 10, 7, 158, 180, 22; 348/744, 516, 546, 548, 222, 229; 356/365; 353/42

[56] References Cited

U.S. PATENT DOCUMENTS

| | | | |
|---|---|---|---|
| 3,885,096 | 5/1975 | Inuiya | 345/180 |
| 4,808,980 | 2/1989 | Drumm | 345/162 |
| 4,843,568 | 6/1989 | Krueger et al. . | |
| 4,846,694 | 7/1989 | Erhardt | 345/182 |
| 5,025,314 | 6/1991 | Tang et al. . | |
| 5,111,284 | 5/1992 | Tsujihara et al. | 348/747 |
| 5,168,531 | 12/1992 | Sigel | 345/157 |
| 5,181,015 | 1/1993 | Marshall et al. | 345/158 |
| 5,181,117 | 1/1993 | Choi et al. | 348/678 |
| 5,239,373 | 8/1993 | Tang et al. . | |
| 5,258,829 | 11/1993 | Matsunaga et al. | 358/527 |

FOREIGN PATENT DOCUMENTS

| | | |
|---|---|---|
| 59-132079 | 7/1984 | Japan . |
| 63-167923 | 7/1988 | Japan . |
| 2132510 | 5/1990 | Japan . |

*Primary Examiner*—Richard Hjerpe
*Assistant Examiner*—Regina Liang
*Attorney, Agent, or Firm*—Antonelli, Terry, Stout & Kraus

[57] ABSTRACT

A multi-scan type display apparatus with pointer function includes a multi-scan type display unit for displaying a plurality of kinds of main picture signals having different numbers of scanning lines and a pointer position identifying signal generating circuit for generating a pointer position identifying signal. The pointer position identifying signal generating circuit transfers the pointer position identifying signal to the multi-scan type display unit, the multi-scan type display unit includes a universal vertical position address signal generating circuit, a horizontal position address signal generating circuit, a pointer signal generating circuit and a superimposing circuit. The pointer signal generating circuit generates a pointer signal in response to the pointer position identifying signal, a universal vertical position address signal and a horizontal position address signal, the pointer signal is superimposed on the main picture signal by the superimposing circuit, so that even if the input signal to the multi-scan type display unit is changed over to a different one having a different number of scanning lines, a pointer display position is kept constant on the display unit, and the pointer position can be moved to a desired position by controlling the pointer position identifying signal.

7 Claims, 11 Drawing Sheets

$$D = \{4(X-Xc)\}^2 + (Y-Yc)^2$$

ns lines. Accordingly, there has been no multi-scan type pointer function
MULTI-SCAN TYPE DISPLAY SYSTEM WITH POINTER FUNCTION

BACKGROUND OF THE INVENTION

The present invention relates to a multi-scan type large screen display system with a pointer function.

The pointer function includes a function for showing a desired position on a large screen display. With a conventional optical overhead projector, the pointer function has been achieved by directly placing the front end of a pencil on a transparency sheet.

In recent years, a CRT projector display which can project a wide range of horizontal and vertical scanning frequencies has come to be utilized for presentations at meetings. As a pointer for the multi-scan type projector display, an optical laser pointer has been used but an electronic pointer has not existed. The optical laser pointer has been able to be used only when a single display unit is used in a room, but this pointer has been incompatible for displaying the same screen display that is displayed by using another display unit which is set in a separate room.

Even when using only one display unit in one room, it has been difficult for a presenter to manipulate the laser pointer with his hand because of an unavoidable movement of his hand.

FIG. 2 shows a general multi-scan type display system. In this drawing, 201, 202 and 203 denote separate kinds of computer signal source and their horizontal scanning frequencies are widely distributed from 30 kHz to 80 kHz. Numbers of their scanning lines are also different from each other.

204 designates a switcher and its input is connected to any one of these signal sources. 205 designates a multi-scan type display. The multi-scan type display 205 display the contents of the screen corresponding to each signal source. In setting vertical coordinates on the display screen, each computer sets them based on a respective total number of scanning lines. Since the vertical coordinates are different for each computer, it has been impossible to connect a common pointer generator.

In the meantime, manual input type PC (personal computers) having a fixed coordinates system have come to be sold at low prices in the market in recent years. According to the manual input type PC having a fixed coordinates system, it is possible to electronically display a pointer on an exclusive single scan type monitor which is attached to the computer. However, it has been difficult to superimpose an output signal of the manual input type PC on the large projector type display, because the horizontal frequency of the manual input type PC has been fixed to a low level of about 32 kHz while the horizontal scanning frequency of the originally intended input signal to the large screen display is variable in the range from about 30 kHz to 80 kHz. Accordingly, there has been no multi-scan type pointer function which can be applied to the multi-scan type projector display.

Generally, in a presentation system, it has been desired to dispose a compact flat panel monitor which can display the same contents as those displayed by the projector type display at the side of the presenter and make a display of the same pointer on the compact monitor. However, this has not been able to be realized because the normal compact flat panel monitor has been a single scan type.

SUMMARY OF THE INVENTION

It is an object of the present invention to provide a multi-scan type display system with pointer function capable of automatically tracing a multi-scan type display.

It is another object of the present invention to provide a multi-scan type display system with pointer function capable of displaying a display with the pointer on a monitor controlled by a presenter.

A first aspect of an embodiment of the present invention is that a multi-scan type display with pointer function includes a multi-scan type display apparatus for displaying a plurality of kinds of main picture signals having different numbers of scanning lines and a pointer position identifying signal generating apparatus for generating a pointer position identifying signal, wherein the pointer position identifying signal generating apparatus transfers the pointer position identifying signal to the multi-scan type display apparatus. The multi-scan type display apparatus includes universal vertical position address signal generating unit, horizontal position address signal generating unit, pointer position identifying signal generating unit and superimposing unit, wherein the pointer position identifying signal generating apparatus generates a pointer signal in response to the pointer position identifying signal, a universal vertical position address signal and a horizontal position address signal, and wherein the pointer signal is superimposed on the main picture signal by the superimposing apparatus.

The universal vertical position address signal generating apparatus may be composed of a phase detector unit, a voltage control oscillator apparatus and a counter unit to be actuated in response to an input of a vertical synchronizing signal of the main picture signal. Also, the universal vertical position address signal generating apparatus may include at least an apparatus for dividing coordinate based on a real number of scanning lines of the main picture signal by the total number of scanning lines.

A transmission path for an output signal from the superimposing apparatus may be connected to a limiter unit for correcting gamma characteristics.

The multi-scan type display system may further comprise a flickering unit for flickering the pointer signal.

The multi-scan type display apparatus may further include a sub-picture signal input terminal added to a main picture signal input terminal and a frame memory unit, wherein writing of the sub-picture signal into the frame memory unit is carried out by horizontal and vertical synchronizing signals of the sub-picture signal, reading of the sub-picture signal from the frame memory unit is carried out by the universal vertical position address signal and horizontal position address signal, and the sub-picture signal is superimposed on the main picture signal by the superimposing apparatus.

The horizontal position address signal can be a horizontal address signal commonly used for correcting convergence of the multi-scan type display apparatus.

A second aspect of the embodiment of the present invention is that a multi-scan type display system with pointer function includes: a multi-scan type display apparatus for displaying a pointer on the display screen, a single-scan type camera apparatus for taking a picture on the display screen, a small-sized monitor apparatus for displaying an output signal from the single-scan type camera apparatus, a pointer position identifying apparatus disposed nearby the small-sized monitor apparatus, and an automatic tracing apparatus for automatically tracing an exposure time of the single-scan type camera unit to a vertical cycle of the multi-scan type display apparatus which includes an up-counter unit and a down-counter unit.

A gain of an amplifier included in the single-scan type camera apparatus may be increased around a peripheral portion of the display screen with respect to a central portion thereof.

With the above-described structure, the pointer signal generating unit supplies a pointer signal of which position is independent of the real number of scanning lines (variable) to the display apparatus.

The universal vertical position address signal generating apparatus generates an address signal in response to the pointer position identifying signal and the universal position coordinate generated by the automatic traced type universal position coordinate generating apparatus, and the pointer signal is superimposed on the multi-scan type main picture signal.

Also, the automatic traced type flickering reducing unit matches the exposure time of a camera with the vertical scanning cycle (variable) of the display, reducing the disturbance of flickering.

Accordingly, the pointer can be always displayed at a desired position of the multi-scan type display by a presenter regardless of the scanning frequency and the number of scanning lines of the main picture signals.

In addition, a picture indicated by the pointer can be simultaneously displayed on the small-sized monitor disposed nearby the presenter, at this time, flickering caused by the different frequency between the vertical scanning frequency of small-sized monitor and the vertical scanning frequency of the main picture signal can be eliminated.

DESCRIPTION OF THE PREFERRED EMBODIMENTS

Figure 1:
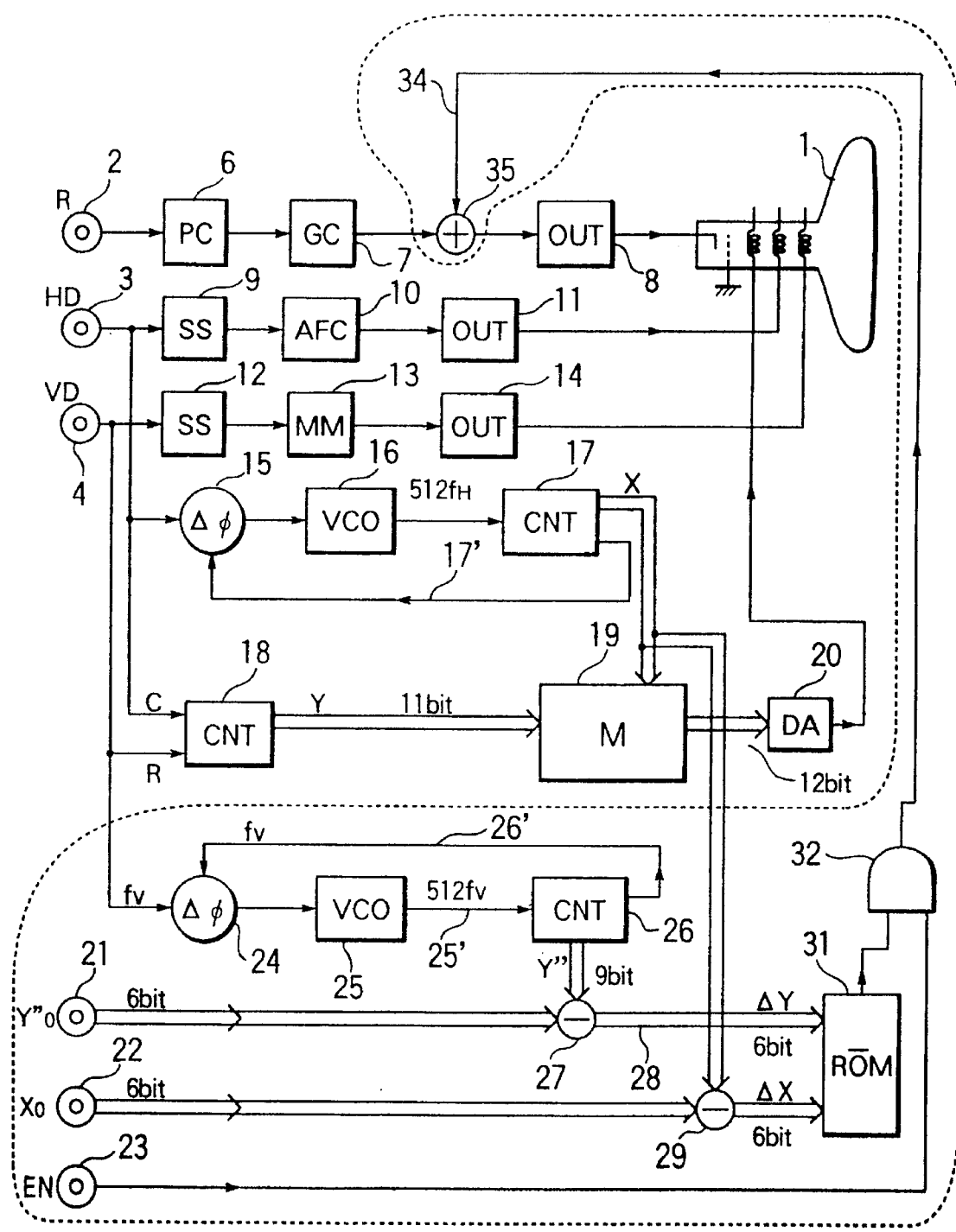
FIG. 1 is a configuration diagram showing a first embodiment of the multi-scan type display system with pointer function according to the present invention.
Figure 2:
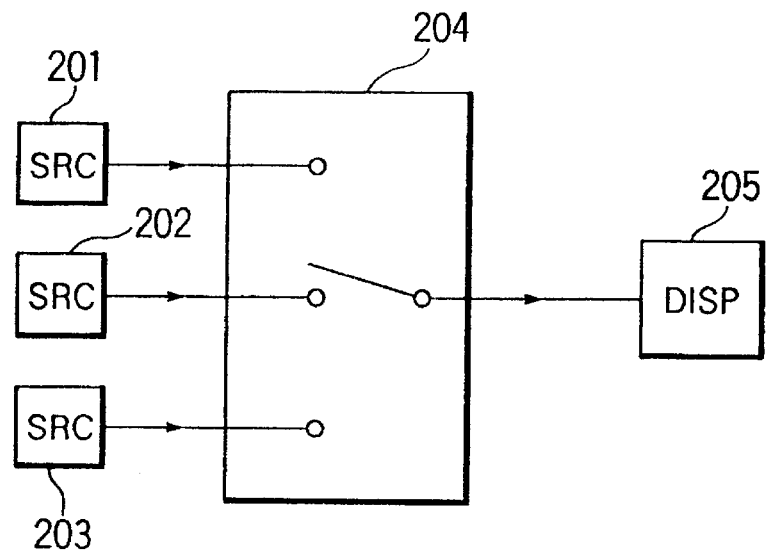
FIG. 2 is an explanatory diagram showing the conventional multi-scan type display system.

A first embodiment of the multi-scan type display system with pointer function according to the present invention is shown in FIG. 1. Referring to FIG. 1, a portion encircled by a dotted line shows a feature of the present invention, and the portion outside the dotted line shows a known multi-scan display portion. Arrows with double lines designate digital signals of at least 2 bits and these arrows with double lines have the same meaning also in the subsequent drawings. Arrows with single lines designate analog signals or digital signals of 1 bit and these arrows with single lines have the same meaning also in the subsequent drawings.

The schematic configuration of the known multi-scan display portion will first be explained. A reference numeral 1 designates a display device which is a CRT in FIG. 1. 2 designates an input terminal for a main picture signal. The number of the scanning lines of a picture signal is variable and therefore the picture signal is called a multi-scan picture signal R. In the case of a color display, both a green signal and a blue signal exist in parallel, but these are omitted from the drawing to simplify the expression. 3 designates an input terminal for a horizontal synchronizing signal and 4 designates an input terminal for a vertical synchronizing signal. 6 designates a black label clamping circuit, 7 designates a gain control circuit and 8 designates an amplifier for a picture signal output. The output of the amplifier 8 is applied to a gradation control circuit of the display device 1 (a cathode electrode of the CRT in the case of FIG. 1). 9 designates a horizontal synchronization separating circuit, 10 designates a horizontal AFC circuit and 11 designates a horizontal deflection output stage, the output of which is applied to a horizontal scanning terminal of the display device 1 (a horizontal deflection coil in the case of FIG. 1). 12 designates a vertical synchronization separation circuit, 13 designates a multivibrator and 14 designates a vertical scanning output unit, the output of which is applied to the vertical scanning terminal of the display device 1 (a vertical deflection coil in the case of FIG. 1). 15 designates a horizontal phase detector and 16 designates a voltage control oscillator, the oscillation frequency of which is 512 times the horizontal scanning frequency $f_H$ (30 kHz to 80 kHz). 17 designates a counter for counting the number of 512. The counter 17 produces an output of a 9 bit horizontal address signal X and a pulse signal 17' of the horizontal period. The pulse signal 17' is fed back to the phase detector 15 to thereby form a PLL (phase lock loop). The horizontal address signal X is used as the horizontal address signal X of a memory unit 19 to be described later. 18 designates a counter for counting the number of horizontal synchronizing signals (pulses) HD input from the counter 3. The counter 18 is reset by a vertical synchronizing signal VD input from the terminal 4. As an output of the counter 18, a vertical address signal Y is obtained based on the real scanning line. 19 designates a memory device to which the horizontal address signal X and the vertical address signal Y based on the actual scanning line are input and a digital signal for correcting a scanning error is obtained as an output. The scanning error correcting signal is also called a raster distortion correcting signal or a convergence correcting signal. 20 designates a converter, the output of which is applied to the scanning error correcting terminal of the display device 1 (a convergence coil in the case of FIG. 1). Scanning error correction is also applied to green color signals and blue color signals but the correction is applied to only red color signals in FIG. 1 to simplify the expression.

The term "multi-scan" means that the horizontal scanning frequency $f_H$ and the vertical scanning frequency $f_V$ of an input signal can be in a plurality of sets instead of one set. Accordingly, the present invention has a pointer for multi-scan added to the multi-scan display unit.

The portion inside the dotted line which shows the feature of the present invention will be explained below. Reference numerals 21 and 22 designate terminals for receiving pointer position identifying signals Yo" and Xo respectively. In the present embodiment, the pointer position identifying signals Yo" and Xo are six bit digital signals for showing vertical positions respectively and these are the signals output from the pointer position identifying device shown in FIG. 18 to be explained later. 23 designates a pointer enable signal input terminal and this signal is output from a separate pointer position identifying device. 24 designates a vertical phase detector and 25 designates a voltage control oscillator, for example, such as a vertical period multi-vibrator circuit which produces an output of a pulse signal that has 512 times the frequency of the vertical scanning frequency $f_V$. 26 designates a counter having the count number of 512 in the present embodiment. Accordingly, as an output of this counter 26, a pulse signal 26' of the vertical period and a universal vertical position address signal Y" are obtained. The pulse signal 26' is fed back to the vertical phase detector 24. Accordingly, the devices 24, 25 and 26 form a vertical period PLL (phase locked loop) circuit. The universal vertical position address signal Y" is input to a subtracter 27 having an overflow limiter. The subtracter subtracts 8Yo" (6 bits of Yo" multiplied by 8 bits produces 9 bits) from the universal vertical position address signal Y" (9 bits) and produces a universal vertical position amplification signal ΔY indicated by 28 as an output. 29 designates a subtracter having an overflow limiter. The subtracter 29 subtracts 8Xo (6 bits of Xo multiplied by 8 bits produces 9 bits) from the horizontal address signal X and produces a horizontal position amplification signal ΔX as an output. In the present embodiment, the signals Y" and X of the subtracters 27 and 29 are 9 bits and the signals Yo" and Xo are 6 bits. Each six bits of the signals Yo" and Xo correspond to the higher six bits of the signals Y" and X, respectively. The subtracter 29 having an overflow limiter has a meaning that the signal ΔX is set to zero when X−8Xo is negative and ΔX is set to a binary number of 111111 when X−8Xo is a positive value exceeding 6 bits. The above also applies to the subtracter 27 having an overflow limiter. 31 designates a pointer ROM, 32 an AND gate and 35 an adder. The pointer ROM 31 is a 4-K bit Read Only Memory which receives an input of the signal ΔX (6 bits) and ΔY (6 bits) as address signals and produces a pointer signal 34. The AND gate 32 outputs "H" (high) only when both the pointer signal 34 and the enable signal 23 are "H". The output signal 34 is applied to an adder 35 and is added to a picture signal transmission path of the display device 1.

Next, the operation of the multi-scan type display system with pointer function shown in FIG. 1 will be explained with reference to FIG. 3.

Figure 3:
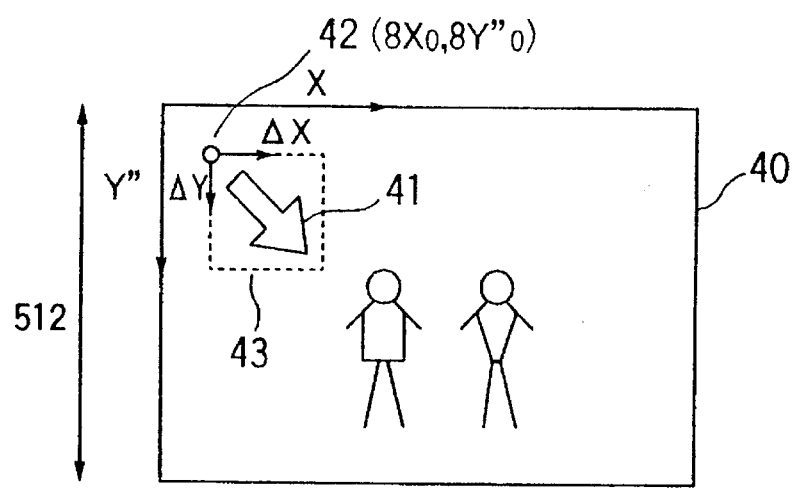
FIG. 3 is an explanatory diagram showing an example of the pointer according to the present invention.

In FIG. 3, a reference numeral 40 designates a display screen of the display device 1. 41 designates a shape of the pointer stored in the ROM 31. 42 designates coordinates of the pointer display position (8Xo, 8Yo"). 43 designates an address plane of the ROM 31.

The point of the present invention is that the pointer signal 34 can be superimposed on the multi-scan picture signal R applied to the main picture signal terminal 2, and that the display position of the pointer signal 34 can be constantly maintained regardless of the number of scanning lines of the multi-scan main picture signal R.

The above point can be achieved by the counter 26 in FIG. 1 counting the number of the scanning lines 512 which is always constant, regardless of the number of the scanning lines of the multi-scan picture signal R, and by the PLL 24, 25 and 26 automatically tracing the vertical synchronizing signal VD. In other words, the dotted line portion of FIG. 1 works as an automatic tracing pointer superimposing unit.

TABLE 1

|  | Main Picture Signal | Pointer Signal |
| --- | --- | --- |
| Horizontal frequency | 30 kHz–80 kHz | ← |
| Vertical Frequency | 50 Hz–80 Hz | ← |
| No. of Scanning Lines | 400–2000 | ← |
| Pointer Position (Xo, Yo) | — | (0–63)x/512 |
| Pointer Shape (ΔX, ΔY) | — | (0–63) /512 |

Table 1 summarizes the features of the present invention. As is apparent from the table, the pointer signal 34 is superimposed by automatically tracing the variable horizontal and vertical coordinates system of the multi-scan picture signal R, although the pointer position identifying coordinates (8Xo, 8Yo") and the pointer shape coordinates (ΔX, ΔY) are independent variables which do not depend on the number of scanning lines of the multi-scan picture signal R.

Figure 4:
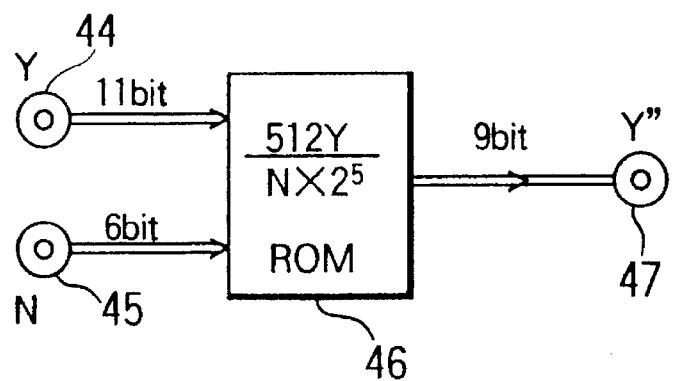
FIG. 4 is a configuration diagram showing another example of the universal vertical position address signal generator.

Next, an example of the case where the PLL 24, 25 and 26 is deleted from FIG. 1 and the circuit shown in FIG. 4 is inserted instead, will be shown.

In FIG. 4, a real scanning line address signal Y of the multi-scan picture signal R is input to a terminal 44 as an output signal of the counter 18 shown in FIG. 1. A numeral N of the higher six digits of the total number of the scanning lines of the multi-scan picture signal R (about 300 to 2048 lines) is input to a terminal 45. 46 designates a ROM of 512K-9-bits, which has the signal Y and the numeral N as an input address and produces a value of 512Y/(32N), or the universal vertical position address signal Y" of 9 bits, is produced as an output. A terminal 47 is an output terminal of the ROM 46, and this terminal is connected to the subtracter 27 of FIG. 1.

The signal Y and the numeral N of the numerator and the denominator of the calculation of 512Y/(32N) of the above ROM 46 depends on the real number of scanning lines which is variable but the quotient thereof becomes the universal position address scanning signal Y" which does not depend on the real number of the scanning lines.

The total number of the scanning lines N of the input terminal 45 in FIG. 4 is the higher six digits of the output maximum value of the counter 18. Accordingly, this can be easily obtained inside the display system, though this will not be explained in detail. The necessary address number of the ROM 46 is determined to be 128K as the sum of the number of the bits of the signal Y and the number of the bits of the numeral N (11+6=17).

Figure 5:
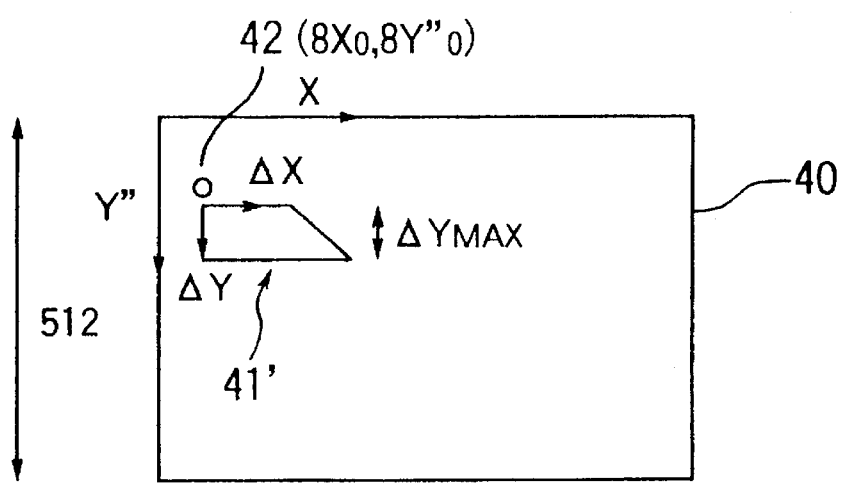
FIG. 5 is another explanatory diagram showing an example of the pointer.

FIG. 5 shows an example of the pointer shape which is simplified. In FIG. 5, a reference numeral 40 designates a display screen, 41' a pointer shape, and 42 starting point coordinates (8Xo, 8Yo") of the pointer. $\Delta Y_{MAX}$ shown in FIG. 5 is a constant showing the vertical width of the pointer.

Figure 6:
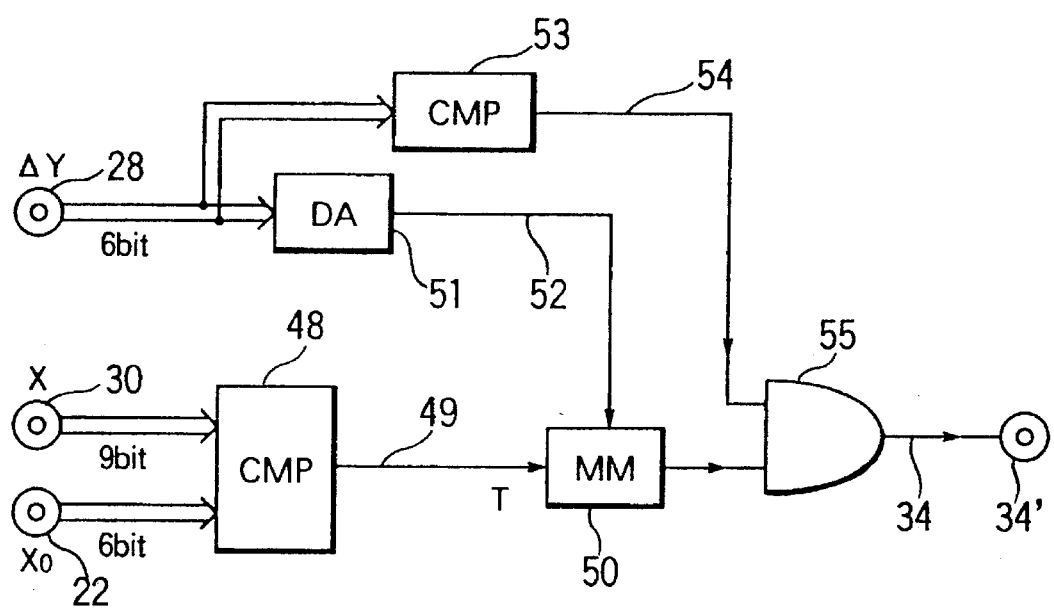
FIG. 6 is a configuration diagram showing another example of the pointer signal generator.

FIG. 6 shows a circuit for generating a pointer shape shown in FIG. 5. In other words, this is a structure which has replaced the portions of the subtracter 29, ROM 31 and AND gate 32 in FIG. 1 with the portions of the devices 48 to 55 in FIG. 6.

In FIG. 6, the terminals 22, 30 and 28 are input terminals of the pointer position identifying signal Xo, horizontal address signal X and universal vertical position amplification signal $\Delta Y$, respectively, and they are connected to the terminal 22, the output side of the counter 17 and the output side of the subtracter 27, respectively. The terminal 34' in FIG. 6 is connected to the adder 35. In FIG. 6, 48 designates a comparator and when the horizontal address signal X of the comparator 48 exceeds 8X, an output signal 49 becomes "H" (high). This output signal 49 is produced as a trigger signal by a multi-vibrator 50. Accordingly, the multi-vibrator 50 produces a pointer signal 34 with the horizontal coordinate 8Xo as a starting point. The pulse width of the pointer signal 34 is controlled by the pulse width control signal 52. The pulse width control signal 52 is obtained by converting the universal vertical position amplification signal $\Delta Y$ of the terminal 28 into an analog signal by a DA converter 51. When the signal $\Delta Y$ is small, the pulse width (the horizontal width of the pointer shown in FIG. 5) becomes small and when the signal $\Delta Y$ is large, the pulse width becomes large. 53 designates a comparator and an output signal 54 of the comparator 53 becomes "H" only when the universal vertical position amplification signal $\Delta Y$ is within the range of 1 to the signal $\Delta Y_{MAX}$. 55 designates an AND gate. The AND gate 55 produces an output pulse signal of the multi-vibrator 50 to a terminal 34' only when the universal vertical position amplification signal $\Delta Y$ is within the range of 1 to the signal $\Delta Y_{MAX}$. As a result, a pointer shape 41' shown in FIG. 5 can be produced.

Figure 7:
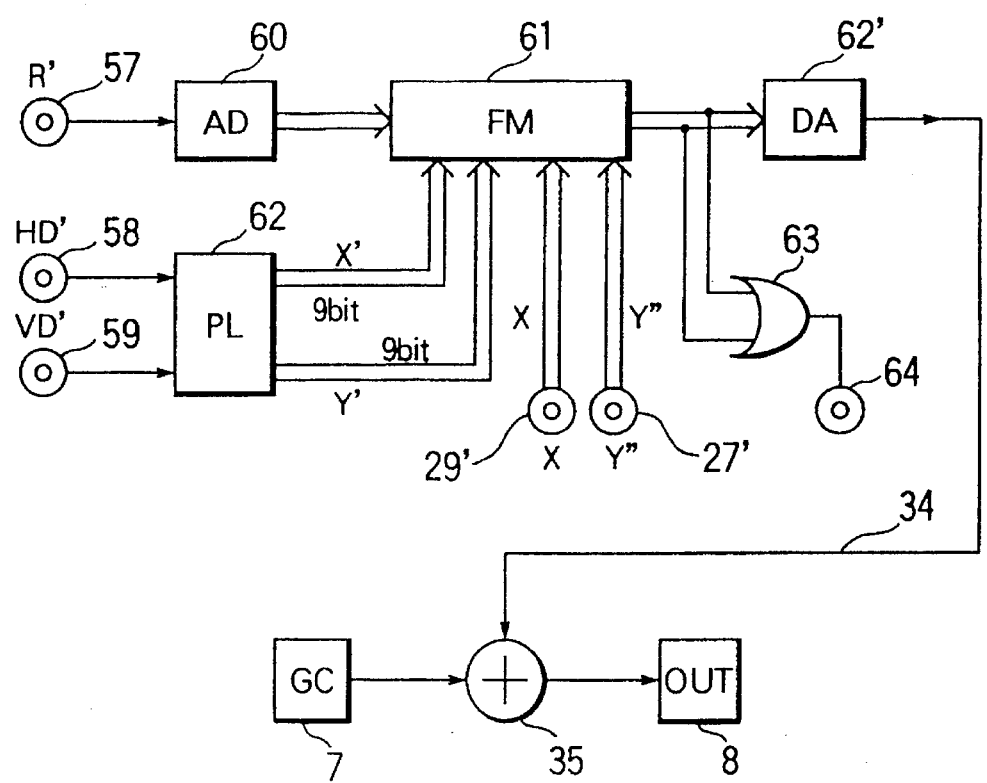
FIG. 7 is a configuration diagram showing another example of the pointer signal generator.

FIG. 7 shows a configuration in which the devices 21, 22, 27, 29 and 31 shown in FIG. 1 are replaced therewith. FIG. 7 shows a case where the sub-picture signal input on the fixed coordinates system (512×512 in this example) is used instead of the pointer position identifying signal (Xo, Y") in FIG. 1. Because of the fixed coordinates system, the sub-picture signal can be produced from a separate manual input board.

Referring to FIG. 7, 57 designates a sub-picture signal input terminal on the single fixed coordinates system and 58 and 59 designate input terminals of the horizontal and vertical synchronizing signals of the sub-picture signal, respectively. 60 designates an AD converter and 61 designates a frame memory. 62 designates a horizontal and vertical address signal generating circuit (a circuit similar to the circuits 15, 16, 17 and 18 in FIG. 1), and the circuit 62 produces writing address signals X' and Y', each 9-bit, as an output. An output sub-picture signal of the AD converter 60 is written in the frame memory 61 based on the writing address signals X' and Y'. In the mean time, as reading address signals, the horizontal address signal X in FIG. 1 and the universal vertical position address signal Y" shown in FIG. 1 or FIG. 4 are supplied through terminals 29' and 27 and these signals are used. A reading output signal from the frame memory 61 is supplied to a DA converter 62' and an OR gate 63 and then to a terminal 64. An output of from the DA converter 62' is supplied to the adder 35 in FIG. 1 as a pointer signal 34. The devices 7 and 8 were already explained in FIG. 1. In the present embodiment, the pointer signal 34 which does not depend on the real number of scanning lines of the multi-scan picture signal R is included in a sub-picture signal R'. Furthermore, by the process of producing the universal vertical position address signal Y" in the reading address signals X and Y" from the frame memory 61, automatic tracing of the pointer display position or display independence of the real number of scanning lines can be secured. The process-of producing the signal Y" is the processing of the PLL 24, 25 and 26 in FIG. 1 or the processing of the ROM 46 in FIG. 4.

Figure 8:
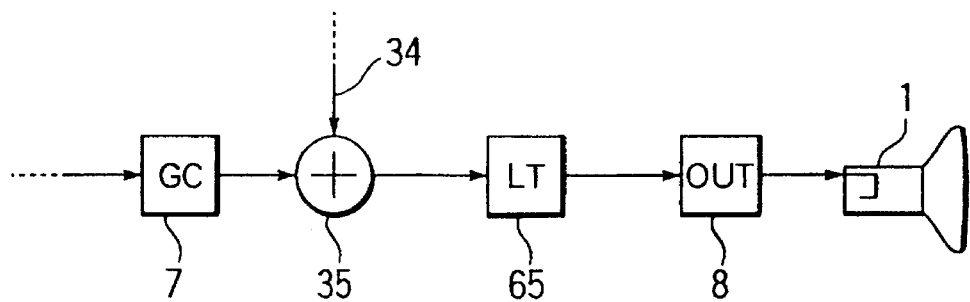
FIG. 8 is a configuration diagram showing another example of the superimposing unit.

FIG. 8 shows a structure of a device 65 that is inserted between the device 35 and the device 8 shown in FIG. 1. The devices 7 and 34 are the same as those shown in FIG. 1

Figure 9:
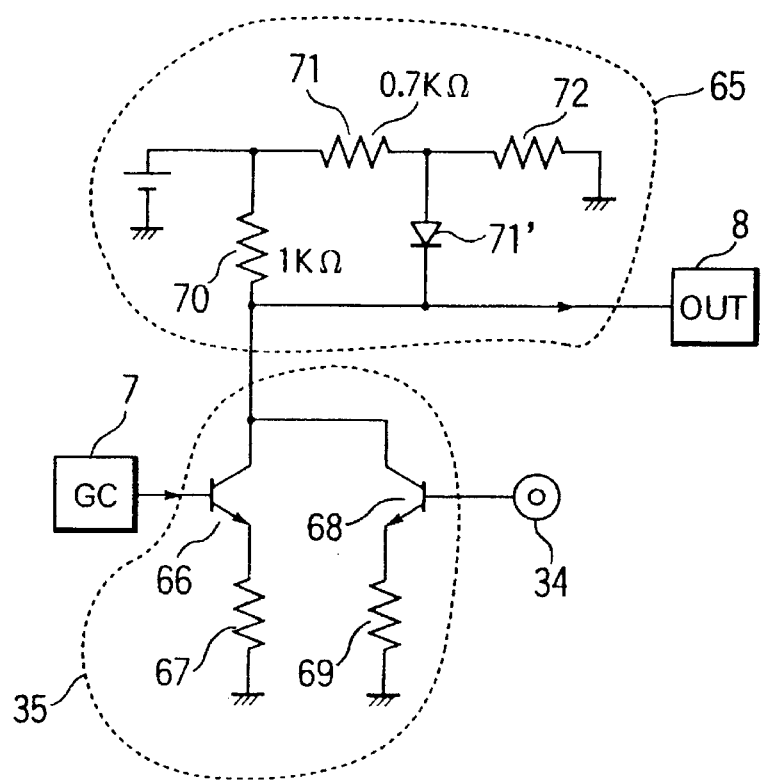
FIG. 9 is a circuit diagram showing a detailed example of the superimposing-system shown in FIG. 8.

In FIG. 8, the device 65 is a limiter circuit for correcting gamma characteristics and its detailed structure is shown within a dotted line 65 in FIG. 9.

In FIG. 9, 66 and 68 designate transistors and 67 and 69 designate emitter resistors. Numerals 66 to 69 form the adder 35.

70 designates a main load resistor, 71 designates a sub-load resistor and 71' a limiter diode. These form the limiter circuit 65 for correction of gamma characteristics. The operation of the limiter circuit 65 or input and output characteristics are shown in FIG. 10.

Figure 10:
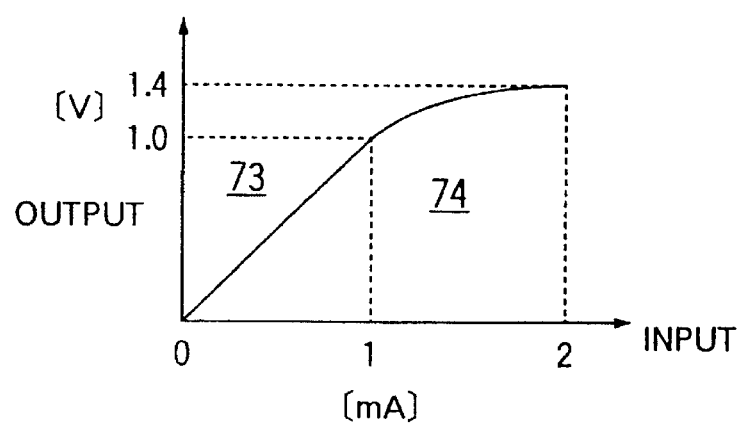
FIG. 10 is a graph explaining the operation of the circuit shown in FIG. 9.

Referring to FIG. 10, 73 designates a limiter non-operating area and 74 designates a limiter operating area. In FIG. 10, each 100% input of the main and sub-picture signals is 1 mA respectively. As is apparent from FIG. 10, an output corresponding to an input 2 mA (200%) is not 200% but is limited to 140%.

The meaning of this limit is to compensate for the so-called gamma characteristics of the display device (CRT) 1. As is well known, an optical output of the display device (CRT) 1 is almost proportional to the square of the input signal of the CRT 1. Accordingly, when the input doubles, the optical output increases about four times. Therefore, when the limiter circuit 65 for the correction of gamma characteristics is not used, the pointer display optical display becomes excessive.

When the limiter characteristics for correcting gamma characteristics are used, the output signal becomes 140% corresponding to the input 200%. Accordingly, in FIG. 8, the input of the display device 1 becomes 140% and its optical output becomes 200%. As a result, it is possible to prevent the optical output of the pointer signal 34 from becoming excessive, and a visually desirable pointer display can be obtained.

Figure 11:
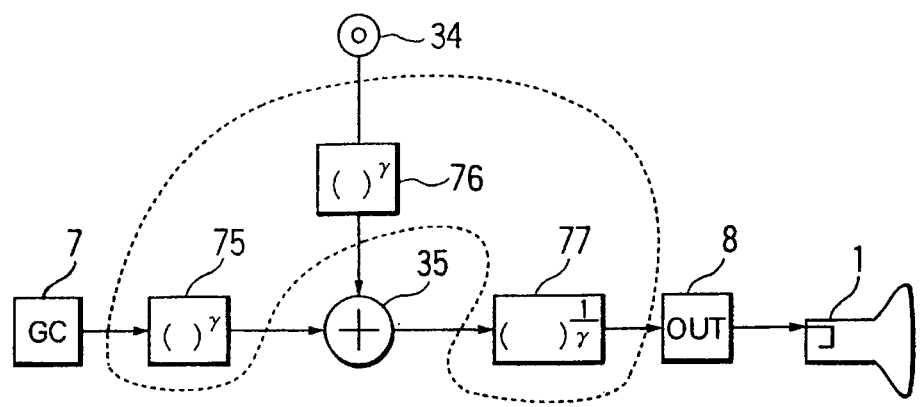
FIG. 11 is a configuration diagram showing another example of the superimposing unit.

FIG. 11 shows an example of the structure that the devices within a dotted line are inserted into the devices 7, 8 and 35 shown in FIG. 1.

In FIG. 11, numerals 75 and 76 designate gamma demodulating circuits and 77 designates a gamma correcting circuit. The value of a gamma correction is usually about 2.2. 2.0 may also be used instead of 2.2, although. In this case, the gamma demodulating circuits 75 and 76 are square circuits and the gamma correcting circuit 77 is a square root circuit. Each of these circuits can be used as a replacement of an approximation circuit shown by a broken line explained along with FIG. 10 which is shown in FIG. 9. Both the gamma demodulating circuit and gamma correcting circuit can be replaced with circuits disclosed in a U.S. patent application which is being filed and corresponds to a Japanese patent application No. 5-37823 filed on Feb. 26, 1993, entitled Apparatus for Improving Definition of Display, by Masanori OGINO, et al and assigned to HITACHI, LTD., the contents of which are incorporated herein by reference.

Figure 12:
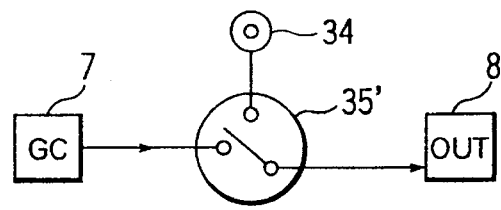
FIG. 12 is a configuration diagram showing another example of the superimposing unit.

FIG. 12 shows a case where the adder 35 in FIG. 1 has been replaced with a change-over switch 35' the rest of the structure is unchanged from that of FIG. 1.

While in FIG. 1, the multi-scan picture signal R is displayed to have the pointer 41 of FIG. 3 superimposed thereon, the multi-scan picture signal R of the portion of the pointer 41 is erased in FIG. 12.

The adder 35 is suitable for a simple pointer display but the change-over switch 35' is suitable for the sub-picture signal utilization system shown in FIG. 6.

Figure 13:
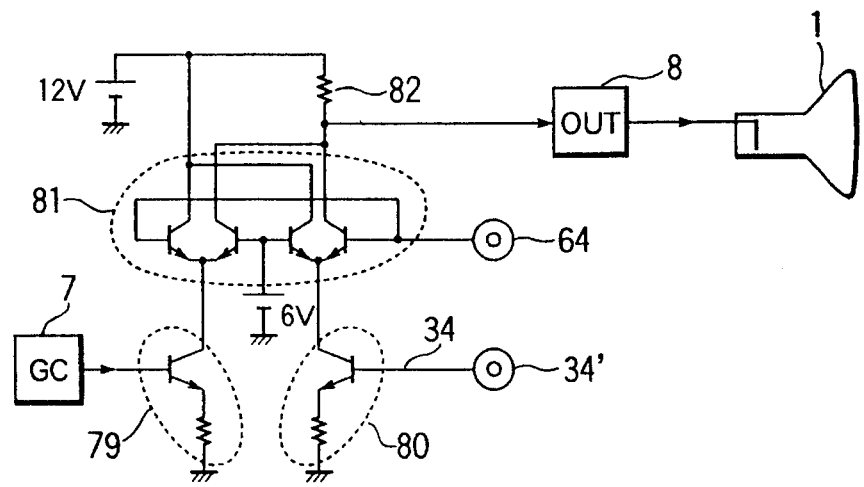
FIG. 13 is a configuration diagram showing another example of the superimposing unit.

FIG. 13 shows a detailed example of the change-over switch 35'.

In FIG. 13, numerals 79 and 80 designate transistor amplifiers respectively, 81 designates a transistor circuit which structures a switching circuit, and 82 designates a load resistor. 64 designates an output terminal of the OR gate 63 shown in FIG. 7. The pointer signal 34 passes through the switching circuit 81 only when the output of the OR gate 63 is "H" and is output to the terminal 34' through the transistor amplifier 80.

Figure 14:
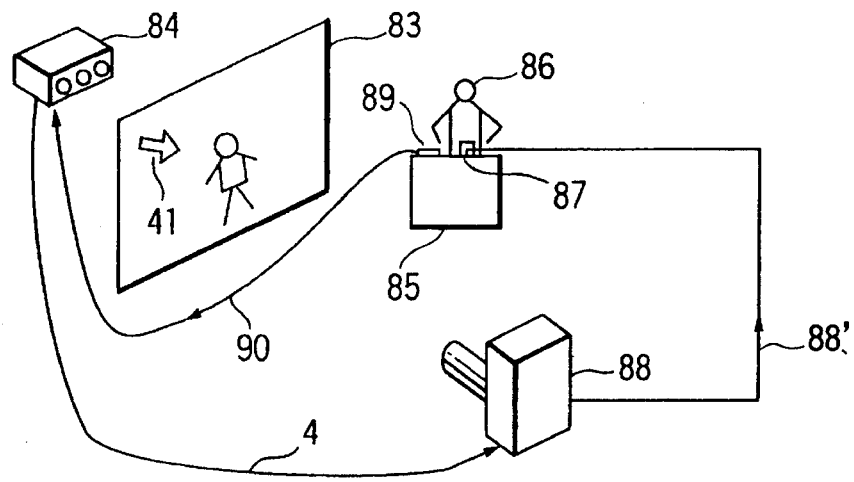
FIG. 14 is a configuration diagram showing a second embodiment of the multi-scan type display system with pointer function according to the present invention.

FIG. 14 shows a second embodiment of the present invention which uses the multi-scan type display system with pointer function. FIG. 14 shows an application to the presentation system using a projector type display.

In FIG. 14, numeral 83 designates a transmission type screen and 84 a multi-scan projector. A circuit in FIG. 1 is used for the projector 84. 41 designates a pointer displayed on the screen 83. 85 designates a lectern for a presenter, 86 a presenter and 87 represents a monitor nearby. A 10-inch liquid crystal monitor, for example, is used for the monitor located beside the presenter. 88 designates a camera, 89 designates a board for producing a display position identifying signal and 90 designates a pointer position signal. 4 designates a vertical synchronizing signal VD corresponding to the multi-scan picture signal R input to the display.

The camera picks up an image on the screen 83 and the output of the camera is transmitted to nearby monitor 87. The pointer position signal 90 may be in the form of a total 12-bit parallel signal for displaying the pointer position identifying signal (Xo, Yo'), or it may also be good to transmit 12-bit information in the known RS232C format and a RS232C decoder is disposed inside the projector to decode the pointer position identifying signal (Xo, Yo"). Alternately, it may also be good to transmit the pointer position signal 90 in the form of a known remote control optical signal in the field of social television technology and dispose a remote controlled optical signal receiver inside the projector 84 to decode the signal (Xo, Yo").

For the camera 88 having a low vertical frequency, a camera compatible for the European PAL system television (vertical frequency 50 Hz) is recommended.

Figure 15:
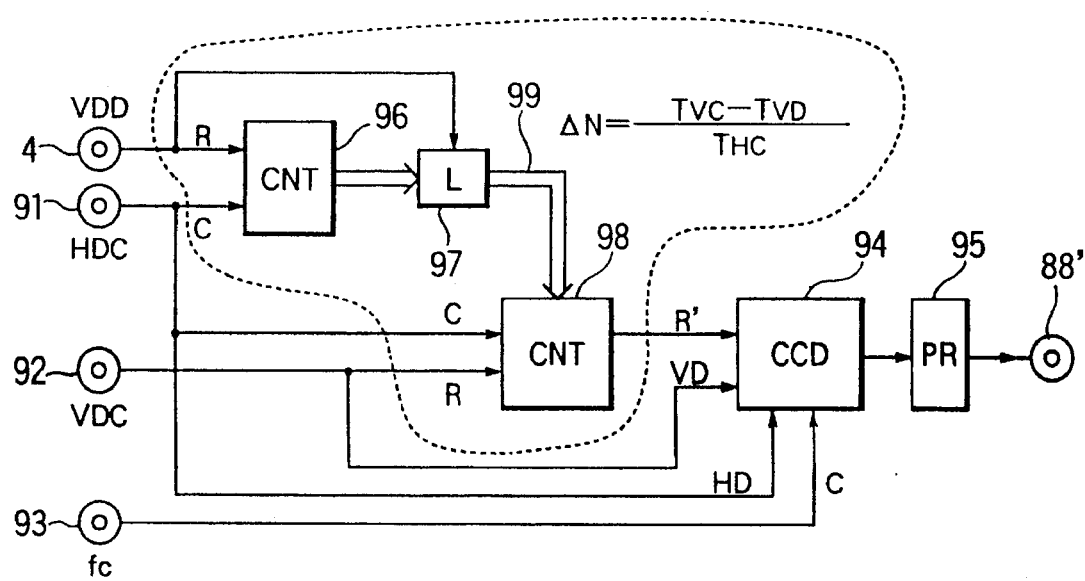
FIG. 15 is a circuit diagram to be used for the camera shown in FIG. 14.

It is recommended that a circuit shown inside a dotted line of FIG. 15 is added to the camera 88 in order to prevent an occurrence of a flicker interference attributable to a differential frequency between the vertical scanning frequency 50 Hz of the camera 88 and the vertical scanning frequency (50 Hz to 80 Hz) of the multi-scan projector 84.

In FIG. 15, the portions outside the dotted line belong to the known camera technology. Numerals 91, 92 and 93 designate a horizontal synchronizing signal HDC, a vertical synchronizing signal VDC and a terminal signal for inputting a clock signal $f_c$ that are produced inside the camera 88 respectively. 95 designates a signal processing portion inside the camera. The portion inside the dotted line will be explained below. 96 designates a down-counter, 97 designates a latch and 98 designates a programmable up-counter. At the count starting point of the down-counter 96, a total number of the scanning lines 312 of the PAL system is set in advance. The down-counter 96 is set by the vertical synchronizing signal VDD of the multi-scan picture signal R which is input from the terminal 4', to count the number of the horizontal synchronizing signal HSC of the camera. A minimum value of the output of the counter-96 is held in the output of the latch 97. The output 99 of the latch 97 becomes the one as displayed by the expression $\Delta N=(T_{VC}-T_{VD})/T_{HC}$ of $\Delta N$ shown in FIG. 15. In this expression, $T_{VC}$ denotes a vertical period of the camera, $T_{HC}$ denotes a horizontal period of the camera and $T_{VD}$ denotes a vertical period of the vertical signal of the multi-scan picture signal R.

Figure 16:
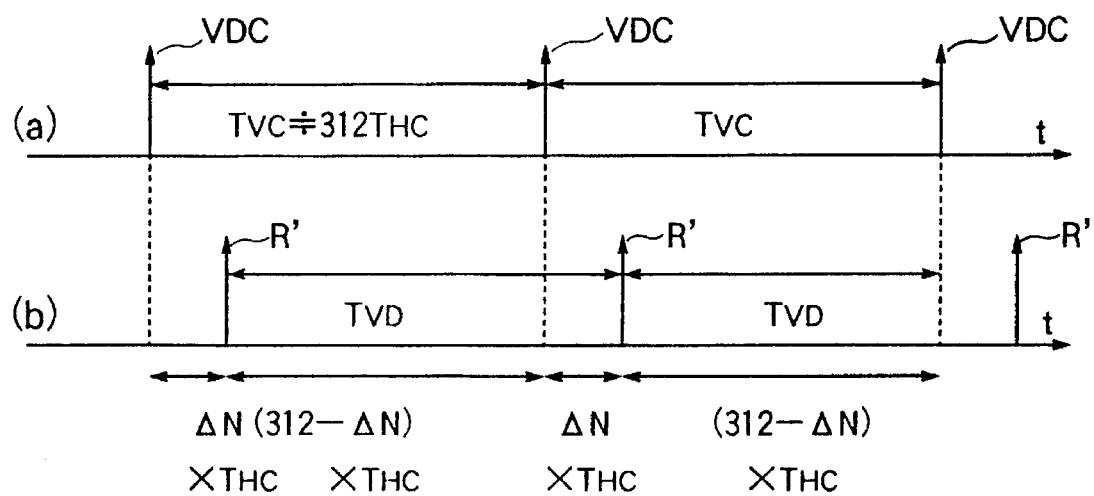
FIG. 16 is a time chart explaining the operation of the circuit diagram shown in FIG. 15.

The output $\Delta N$ determines a count end point value of the programmable up-counter 98. The programmable up-counter 98 counts the number of the horizontal synchronizing signal HDC of the camera. The up-counter is disabled when it reaches the count end point and is then reset by the vertical synchronizing signal VDC of the camera to start counting. When the programmable up-counter 98 reaches the count end point, the up-counter 98 produces a reset signal R' as an output. The reset signal R' resets the CCD device 94. With the abovedescribed structure, a flickerless operation can be achieved, and this will be explained by referring to a waveform diagram shown in FIG. 16. In FIG. 16, (a) shows a timing of the vertical synchronizing signal VDC of the camera and (b) shows a timing of the reset signal R'. As is known, the CCD device 94 generally outputs a level of light that has been received during the period from when a reset signal R' was input until the a vertical synchronizing signal VDC is input. This period matches the vertical scanning period of the multi-scan picture signal R based on the definition of the output $\Delta N$ shown in FIG. 15. In other words, with the above structure, it is possible to match the camera exposure time to the vertical scanning period of the multi-scan picture signal R. Thus, a flickerless operation can be achieved.

In FIG. 15, the counter 96 may be used as the up-counter and accordingly the output $\Delta N$ may be $T_{VD}/T_{HC}$ and the counter 98 as the down counter. Therefore, this is generally expressed as follows. The counter 96 counts the total number of the horizontal synchronizing signal HDC of the camera during the vertical scanning period of the multi-scan picture signal R. The counter 98 counts the complement after subtracting the total count number of the counter 96 from the total number of the scanning lines of the camera.

Figure 17:
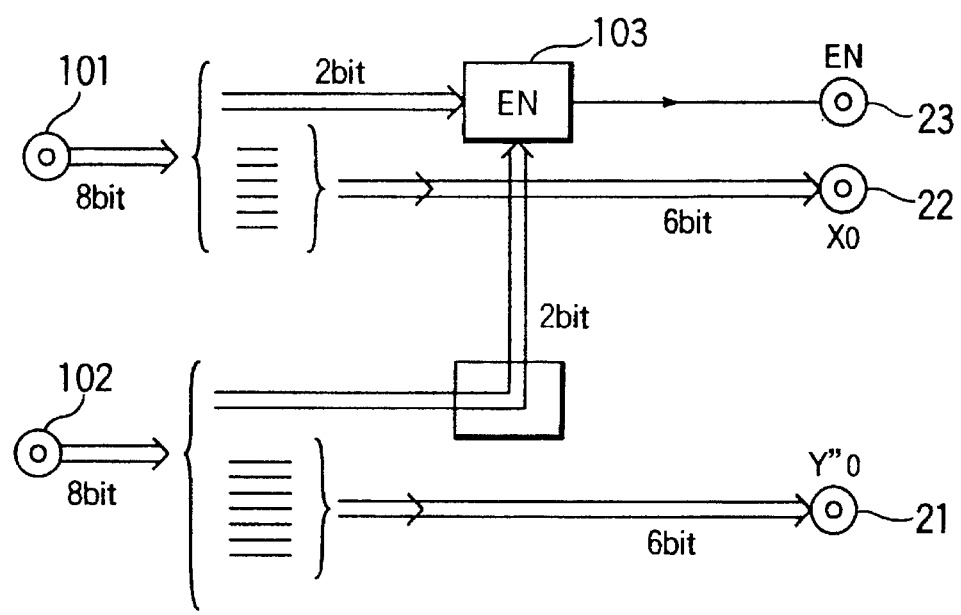
FIG. 17 is a circuit diagram to be connected to the pointer position identifying signal generating board.

FIG. 17 shows a structure where the device 103 is connected to the terminal 23 shown in FIG. 1, transmission paths are connected to the terminals 22 and 21 and the transmission paths are connected to the terminals 101 and 102.

This example shows a case where the circuit shown in FIG. 1 is applied to a multi-screen display. The multi-screen display is one in which a unit display is disposed in a matrix shape of the four rows and four columns totalling 16 displays, for example. How to supply the pointer position identifying signal (Xo, Yo") to each unit display in this case is shown in FIG. 17. In FIG. 17, 101 and 102 designate terminals for receiving horizontal and vertical position identifying signals each having 6 bits respectively. A board 89 for producing a pointer display position signal to be described later is connected to the terminals 101 and 102. 103 designates a gate circuit for producing an enable signal. The gate circuit 103 is provided by a respective circuit for each device of 4 rows and 4 columns, thus a total of 16 circuits are provided. The horizontal and vertical position identifying signals, 8 bits each, are used as the horizontal pointer identifying signal Xo and the vertical pointer position identifying signal Yo", 6 bits each, of each respective display. In other words, higher two bit signals of the horizontal and vertical position identifying signals, 8 bits each, are input respectively to the gate circuit 103 for producing enable signals. For convenience sake, each unit display is named as (k, h) based on their layout position. Then, when the gate circuit 103 for generating an enable signal is for the unit display (k,h), the gate circuit 103 produces an output of "H" only when the input signals of each 2 bits match the unit display (k, h).

Accordingly, it is possible to display the pointer on any desired display by the multi-screen display of the present structure.

Figure 18:
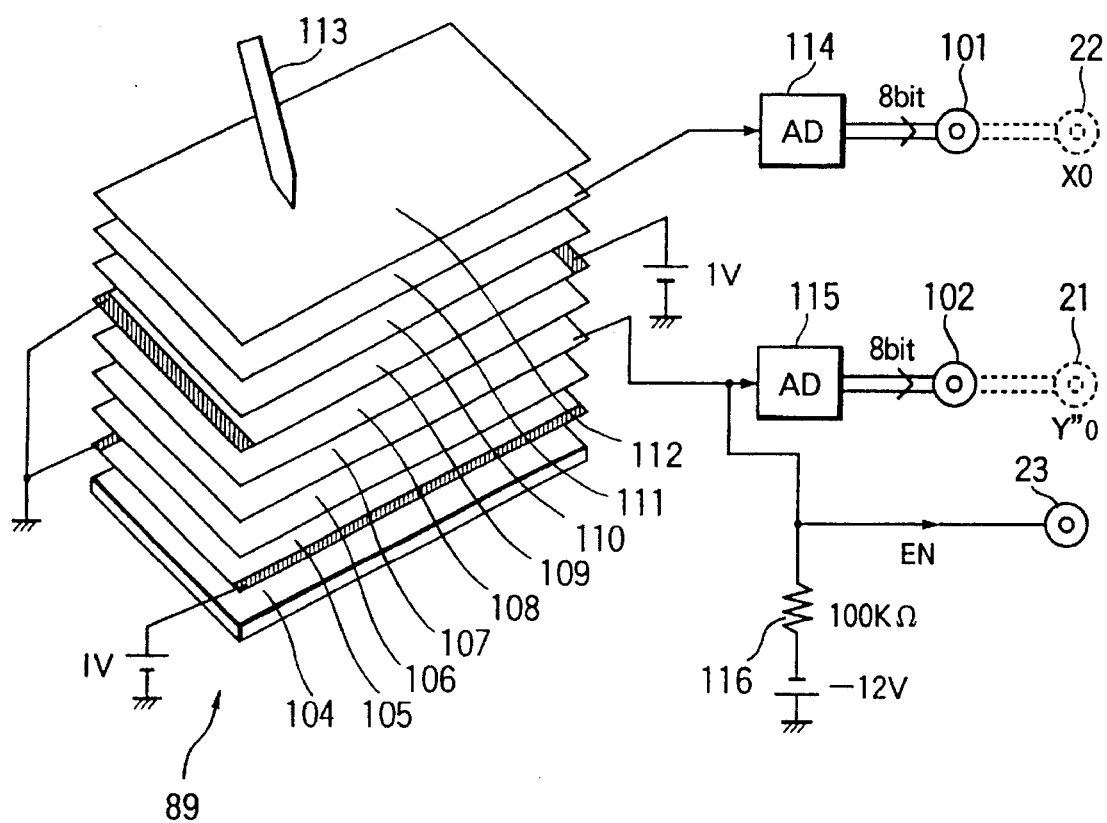
FIG. 18 is a configuration diagram showing the pointer position identifying signal generating board and the circuit.

FIG. 18 shows a detailed structure of the board 89 for producing a pointer display position identifying signal shown in FIG. 14.

In FIG. 18, numeral 104 designates an insulation supporting plate and 105 a sheet shaped resistor. At each of the upper and lower end shadowed portions of the sheet resistor 105, a conductive film is adhered thereto, and each film is connected to a zero potential and 1 V potential respectively. 106 designates an elastomer sheet for rendering only a pressure-applied portion conductive in a width direction, 107 designates a conductive sheet, 108 designates an insulation sheet and 109 designates a sheet shaped resistor. At each of the left and right end shadowed portions of the sheet resistor 109, a conductive film is adhered to and each film is connected to a zero potential and 1 V potential respectively. 110 designates an elastomer sheet for rendering only a pressure-applied portion conductive in a width direction, 111 designates a conductive sheet, 112 designates an insulation protection sheet and 113 designates an identification bar. The elements 104 to 112 are laminated to form the board 89 for producing a pointer display position signal. When pressure is applied to the board with the front end of the identification bar 113, the potential of the sheet 109 is transmitted at the pressure-applied portion to the sheet 111 and then input to an AD converter 114. Further, the potential of the sheet 105 is transmitted to the sheet 107 and then transmitted to an AD converter 115. The AD converters 114 and 115 convert the potential of their inputs 0 to 1 V to the 8 bit horizontal position coordinates X and the 8 bit vertical position coordinates Yo" respectively. When a stand-alone projector system is applied, the higher 6 bit signals among the 8 bit signals are transmitted to the projector 84 shown in FIG. 14. The signals may be transmitted in parallel or they may be in a serial transmission of the RS232C format. The signals are transmitted to the terminals 22 and 21 shown in FIG. 1.

In the application to the multi-screen system, the 8 bit signals are transmitted directly to the terminals 101 and 102 in FIG. 17.

In any case, in the presentation system shown in FIG. 14, the presenter 86 can insert a pointer to a desired position while looking at the monitor 87 at the front by scanning the identification bar 113 of FIG. 18. Thus, the efficiency of the presentation can be improved.

The pointer position identifying signal (X, Yo") can also be transmitted in parallel to projectors working in parallel within other rooms, and not only to the projector 84 in the room where the presenter 86 is located. With the above arrangement, the audience in the rooms where the presenter is not present can also receive the presentation effectively by the screen having a pointer display.

The enable signal EN in FIG. 1 can be supplied from the terminal 23 shown in FIG. 18. In the state that pressure is not applied to the identification bar 113, the potential of the terminal 23 in FIG. 18 is negative ("L") and in the state pressure is applied to the identification bar 113, the potential of the terminal 23 is positive ("H"). This is due to the operation of the resistor 116 and the negative power source connected thereto.

As an alternative of the board 89 for identifying the pointer position, a known mouse, a track ball or a joy-stick usually used for a personal computer can be used.

Figure 19:
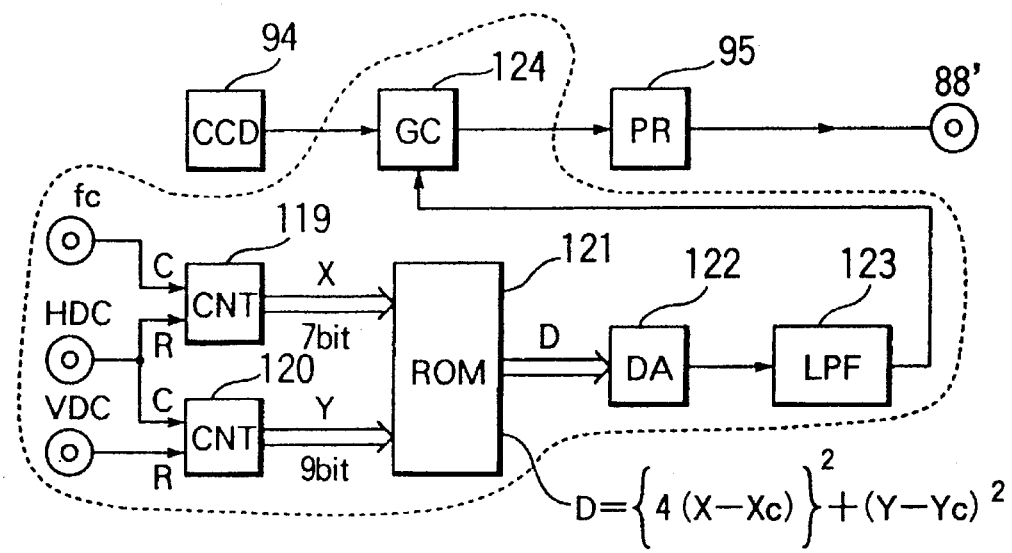
FIG. 19 is a circuit diagram to be added to FIG. 15.

FIG. 19 shows a case where the structure encircled by a dotted line is added between the devices 94 and 95 shown in FIG. 15, with the rest of the structure remaining unchanged from that of FIG. 15.

Generally, a projector type display has the luminance of the peripheral portion of the screen deteriorated to the level of about 0.3 times of the luminance of the center of the screen. Accordingly, the luminance of the peripheral portion of the monitor 87 at the front in FIG. 14 is also deteriorated. In order to compensate for this loss of luminance, it is effective to compensate for the output signal of the camera 88 in advance. For this purpose, a relative peripheral luminance compensation circuit of the camera 88 shown inside the dotted line of FIG. 19 is added.

Numerals 119 and 120 designate counters, 121 a 64K byte ROM, 122 a DA converter, 123 a low-pass filter of the band width of about 2 MHz and 124 a gain control circuit.

The counter 119 counts the clock signal of the camera 88 and is reset by the horizontal synchronizing signal HDC. The upper 7 bit signal of the horizontal address signal which is an output of the counter 119 is input to the address terminal of the ROM 121. The counter 120 counts the horizontal synchronizing signal HDS and is reset by the vertical synchronizing signal VDC. The counter produces an output of a 9 bit vertical address signal Y, which is applied to the address terminal of the ROM 121. The ROM 121 has the signals X and Y as inputs and produces an output of D based on an expression shown in FIG. 19, that is $D=\{4(x-Xc)\}^2+(Y-Yc)^2$. In this expression, Xc and Yc show a horizontal address and a vertical address respectively of the center of the screen. Accordingly, the value of the output D is the minimum at the center portion of the screen and increases parabolically towards the peripheral portion. The output of the ROM 121 is converted into an analog signal by the DA converter and is then low-pass filtered by the LPF 123. The output of the LPF 123 is applied to the control terminal of the gain control circuit 124 to obtain the gain of the picture signal of the camera 88. The gain becomes smaller at the center of the screen and becomes larger at the peripheral portion of the screen. Accordingly, based on the present structure, it is possible to compensate for deterioration of the amplitude of the picture signal of the camera which is attributable to the deterioration of the peripheral luminance of the projector type display. As a result, it is possible to solve the problem in viewing the screen on the monitor 87 at the front in FIG. 14.

Figure 20:
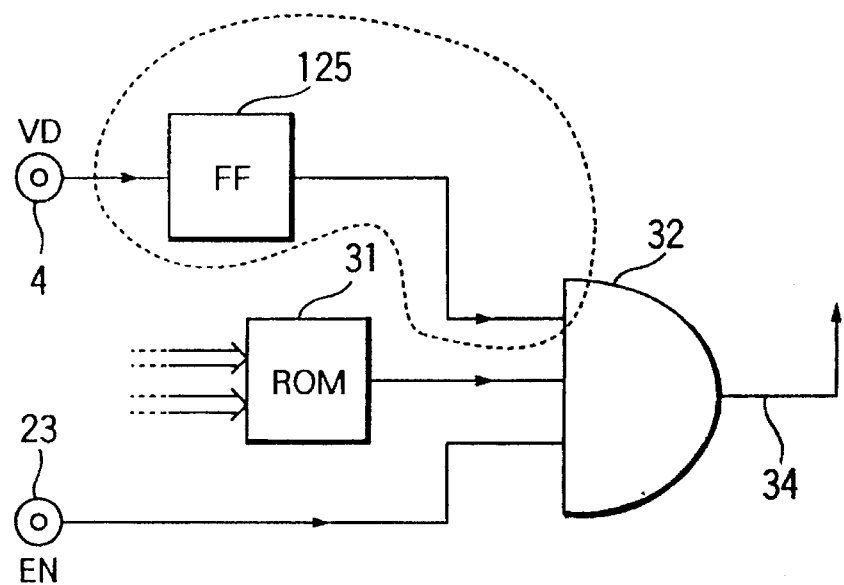
FIG. 20 is a configuration diagram showing another example of the pointer signal generator.

In FIG. 3, it is sometimes desirable to have intentional flickering in order to focus attention of the audience to the pointer 41. In order to flicker the pointer, the pointer signal 34 is flickered in FIG. 1. For this purpose, a circuit shown inside a dotted line in FIG. 20 is added to the circuit of FIG. 1. 125 designates a flip-flop, the outputs "H" and "L" of which are replaced with each other every time an input vertical synchronizing signal VD is applied from the terminal 4. Accordingly, the pointer signal 34 of the output of the AND gate 32 flickers by repeatedly turning on and off at each vertical period. Thus, flickering can be achieved. In FIG. 13, flickering can also be done by turning on and off the terminal 64 at each vertical period.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A multi-scan type display system with a pointer function for indicating a desired position on a display comprising:

multi-scan type display means for displaying a plurality of kinds of main picture signals having different numbers of scanning lines; and pointer position identifying signal generating means for generating a pointer position identifying signal, wherein said pointer position identifying signal generating means transfers the pointer position identifying signal to said multi-scan type display means;

said multi-scan type display means includes:

universal vertical position address signal generating means, horizontal position address signal generating means, pointer signal generating means, and superimposing means, wherein said pointer signal generating means generates a pointer signal in response to the pointer position identifying signal, a universal vertical position address signal and a horizontal position address signal, said universal vertical position address signal addressing universally consistent screen position by compensation of said different numbers of scanning lines, and wherein said superimposing means superimposes the pointer signal on the main picture signal.

2. A multi-scan type display system with pointer function according to claim 1, wherein said universal vertical position address signal generating means includes phase detector means, voltage control oscillator means and counter means to be actuated in response to an input of a vertical synchronizing signal of the main picture signal.

3. A multi-scan type display system with pointer function according to claim 1, wherein said universal vertical position address signal generating means includes at least means for dividing coordinates based on a real number of scanning lines of the main picture signal by a total number of scanning lines.

4. A multi-scan type display system with pointer function according to claim 1, wherein a transmission path for an output signal from said superimposing means is connected to limiter means for correcting gamma characteristics.

5. A multi-scan type display system with pointer function according to claim 1, further comprising flickering means for flickering the pointer signal.

6. A multi-scan type display system with pointer function according to claim 1, said multi-scan type display means further includes:

a sub-picture signal input terminal added to a main picture signal input terminal, and frame memory means, wherein writing of the sub-picture signal into said frame memory means is carried out by horizontal and vertical synchronizing signals of the sub-picture signal, reading of the sub-picture signal from said frame memory means is carried out by the universal vertical position address signal and horizontal position address signal, and superimposition of the sub-picture signal on the main picture signal is carried out by said superimposing means.

7. A multi-scan type display system with pointer function according to claim 1, wherein the horizontal position address signal is commonly used in a horizontal address signal for correcting convergence of said multi-scan type display means.

* * * * *